United States Patent
Miller et al.

(10) Patent No.: US 7,251,313 B1
(45) Date of Patent: Jul. 31, 2007

(54) METHOD AND SYSTEM FOR RETURNING A CALL BASED ON INFORMATION IN A VOICEMAIL MESSAGE

(75) Inventors: Robert H. Miller, Leawood, KS (US); Elizabeth Roche, Prairie Valley, KS (US); Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 491 days.

(21) Appl. No.: 10/823,363

(22) Filed: Apr. 12, 2004

(51) Int. Cl.
*H04M 1/64* (2006.01)
(52) U.S. Cl. .................... 379/88.01; 379/281
(58) Field of Classification Search ............... 379/67.1, 379/88.01, 88.02, 88.03, 88.04, 88.08, 88.19, 379/88.22, 281; 704/270, 275, 276
See application file for complete search history.

(56) References Cited

U.S. PATENT DOCUMENTS

| | | | |
|---|---|---|---|
| 6,069,888 A | 5/2000 | LaRocca | 370/342 |
| 6,219,407 B1* | 4/2001 | Kanevsky et al. | 379/88.02 |
| 6,249,765 B1* | 6/2001 | Adler et al. | 704/500 |
| 6,567,506 B1* | 5/2003 | Kermani | 379/88.01 |
| 6,570,964 B1* | 5/2003 | Murveit et al. | 379/67.1 |
| 6,785,367 B2* | 8/2004 | Horvath et al. | 379/88.04 |
| 6,788,767 B2* | 9/2004 | Lambke | 379/88.01 |
| 7,092,496 B1* | 8/2006 | Maes et al. | 379/88.01 |
| 2003/0026392 A1* | 2/2003 | Brown et al. | 379/88.13 |
| 2003/0081738 A1* | 5/2003 | Kohnle et al. | 379/67.1 |
| 2004/0264667 A1* | 12/2004 | Hu | 379/210.01 |

* cited by examiner

*Primary Examiner*—Fan Tsang
*Assistant Examiner*—Olisa Anwah

(57) ABSTRACT

A method for returning a phone call based on information contained in a voicemail message. The method comprises receiving the voicemail message and applying service logic to analyze the voicemail message to extract a spoken phone number included in the voicemail message. The method further comprises associating the extracted phone number with the voicemail message and, in conjunction with retrieving the voicemail message, providing a recipient of the voicemail message with an option to dial the extracted phone number.

12 Claims, 6 Drawing Sheets

METHOD AND SYSTEM FOR RETURNING A CALL BASED ON INFORMATION IN A VOICEMAIL MESSAGE

FIELD OF THE INVENTION

This invention relates to returning phone calls from a voicemail system. More specifically, this invention relates to returning phone calls based on information extracted from messages left on a voicemail system.

DESCRIPTION OF RELATED ART

Voicemail is a feature that is common to many modern telephony systems, including both landline and wireless systems. As is known, when a call is placed to a subscriber on a telephony system that includes a voicemail system and that call is not answered, the call is redirected to an automated system that instructs and enables the caller to record a voicemail message. The voicemail message is then typically retrieved by the intended recipient at a later time. An example of a current voicemail system is described in U.S. Pat. No. 6,069,888 to LaRocca, the disclosure of which is herein incorporated by reference. Such systems may include a variety of additional features for the routing and handling of messages, but one primary purpose is the same for such systems. This purpose is to convey information from a caller to a recipient in the event the recipient is unavailable or simply chooses to not answer his/her phone.

One additional feature of current voicemail systems is to allow the recipient of a voicemail message to place a return call to an original calling party who left the voicemail message. This is typically accomplished by a call-back option being provided to the message recipient during retrieval of the voicemail message. For example, the recipient may be prompted to press a particular button on his/her phone to place a return call to the original caller. Such a feature is easily accomplished when the phone number of the calling party is known to the voicemail system, such as from caller identification (caller-id) information associated with the original call, or from contact information for the caller that has been previously stored in the voicemail system by the recipient (which may be accessed based on caller-id information for the original call). Such a call-back feature may be particularly useful when the recipient's phone is a mobile phone, as this feature speeds the process of returning a call because the voicemail message recipient does not have to retrieve and/or dial the caller's number. This may be beneficial when the recipient is walking from one place to another, driving a vehicle, or when the caller's number is currently unavailable to the recipient, for example.

However, in current systems, the ability to return a call to an original caller who left a voicemail message is limited to the voicemail system's knowledge of the phone number(s) associated with that caller. Even when the voicemail system has knowledge of certain phone number(s) associated with the source of a voicemail message, it is not unusual for the caller to recite, in the course of recording the voicemail message, a phone number not known to the system. For example, a caller might leave a voice mail for a recipient and provide a phone number that the caller can be reached at, such as a friend's residence phone number, a hotel phone number, among any number of other possibilities.

While the voicemail system might have a variety of phone numbers associated with the caller (e.g., home, work, mobile, etc.), without any prior knowledge or association with the phone number recited in the voicemail message, that spoken phone number would not be known to the system. Therefore, the voicemail system would be unable to offer the recipient an option to place a return call to the spoken number left in the voicemail.

When retrieving this message, the recipient may, for any number of reasons, find it difficult, impossible, or simply inconvenient to write down and/or dial the number in the message. Without systematic aid from the voicemail system, the recipient would be unable to return the call to the original caller until he/she was able write down and/or dial the spoken phone number.

SUMMARY

A method for returning a phone call to a spoken phone number that is left in a voicemail message includes extracting the spoken phone number from the voicemail message, associating the extracted phone number with the voicemail message and providing a recipient of the voicemail message an option to place a return call to the extracted phone number. In such a method, a voicemail message including the spoken phone number is received. Service logic is then applied to the voicemail message to extract the spoken phone number included in the voicemail message. The service logic may include a speech recognition engine implemented with machine readable instructions for extracting the spoken phone number. The speech recognition engine may be implemented in a voicemail message processing entity, which may included in an existing voicemail platform or may be implemented as a separate entity.

Once the spoken phone number is extracted, the extracted phone number is associated with the voicemail message, such as in a field of a database record associated with the voicemail message. When the recipient of the voicemail message retrieves the message, the voicemail system (e.g., at a voicemail user interface) provides the recipient with an option to dial the extracted phone number. The dialing option may be selected by pressing a particular key on the recipient's phone (e.g., the "8" key) or by a spoken response. Responsive to the recipient selecting the dialing option, the voicemail user interface may effect dialing of the extracted number in a similar fashion as dialing numbers previously known to the voicemail system. Such an approach allows a voicemail recipient to return a call to a spoken phone number left in a voicemail message not known to the system without having to write down, log or dial the spoken phone number.

A voicemail system for returning a phone call to a spoken phone number that is left in a voicemail message includes a voicemail user interface, a message store operatively coupled with the voicemail user interface and a voicemail message processor operatively coupled with the message store. It will be appreciated that each of these elements may be implemented as separate platforms or, alternatively, two of more of the entities may be combined in a single platform with the entities being operatively coupled, as indicated above.

In such a voicemail system, the voicemail message processor includes service logic for analyzing the content of a voicemail message received at the voicemail user interface and communicated to the voicemail message processor, extracting a spoken phone number included in the voicemail message and communicating the extracted phone number to the message store. The extracted number is associated with the voicemail message in the message store, such as in a field in a voicemail message database record.

The voicemail user interface includes service logic for providing a recipient of the voicemail message an option to dial the extracted phone number in response to the voicemail message during retrieval of the voicemail message. Such a voicemail system provides the advantage of allowing a voicemail recipient to return a call to a spoken phone number left in a voicemail message without having to write down and/or dial the spoken phone number, in similar fashion as the method described above.

These and other aspects will become apparent to those of ordinary skill in the art by reading the following detailed description, with reference, where appropriate, to the accompanying drawings. Further, it should be understood that the embodiments noted in this summary are not intended to limit the scope of the invention as claimed.

BRIEF DESCRIPTION OF THE DRAWINGS

Embodiments of the present invention are described herein with reference to the drawings, in which.

DETAILED DESCRIPTION

It is noted that this disclosure will discuss embodiments generally in the context of wireless communication systems. It will be appreciated, however, the invention is not limited to use with wireless communication systems and may be employed in landline communication systems, in Voice over Internet Protocol communication systems, among other possible telecommunication systems.

Overview of a System for Returning Phone Calls

Figure 1:
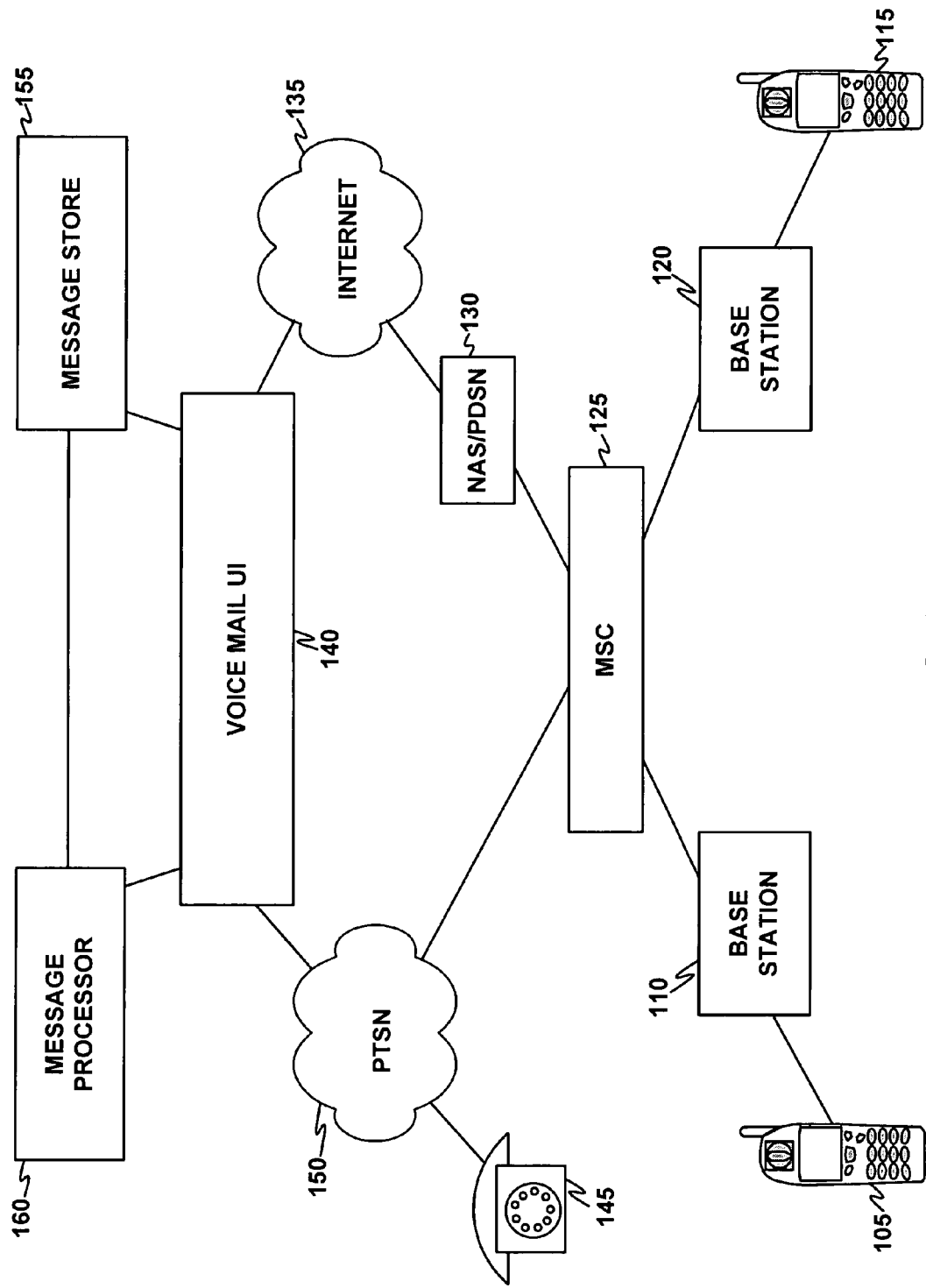
FIG. 1 is a network diagram illustrating a communications system that includes a voicemail system in accordance with an embodiment of the invention.

Referring now to FIG. 1, a network diagram is shown that illustrates a communication network which employs a voicemail system that provides voicemail recipients the ability to return calls to callers that have left voicemail messages including a spoken telephone number. The network in FIG. 1 includes a first mobile phone 105 which is coupled (via a radio interface) with a first base station 110. The base station 110 is further coupled with a mobile switching center (MSC) 125. A second mobile phone 115 communicates with the MSC 125 via a second base station 120 (via a radio interface). The MSC 130 is also coupled with a network access server/packet data serving node (PDSN) 130, which is in turn coupled with the Internet 135. It will be appreciated that the Internet may be any packet switched network, such as a local area network.

A voicemail user interface (voicemail UI) 140 is also coupled with the Internet 135 to provide access to the voicemail system for mobile phones 105 and/or 115. Alternatively, the MSC 140 may communicate with the voicemail UI 140 via a public switched telephone network (PSTN) 150. Such mobile communication network configurations for providing communication access from mobile phones 105 and 115 to a voicemail system are known and will not be discussed in detail here. It will be appreciated that a similar communication path between the voicemail system and a landline phone 145 in FIG. 1 may be implemented via the PSTN 150. Additionally, other communication paths may be used to provide access to other telephony devices, such as a Voice over Internet Protocol phone (not shown). Such a device may be coupled with the PDSN 130 through an Internet Service Provider, for example.

For the network shown in FIG. 1, the voicemail system takes the form of the voicemail UI 140, a message store 155 and a voicemail message processor 160. As shown in FIG. 1, these are entities are implemented as three separate platforms. However, in other embodiments, the voicemail UI 140, the message store 155 and the message processor 160 may be implemented using additional platform or fewer platforms. For purposes of this disclosure, the voicemail systems in FIGS. 1 and 2 will be described as three separate platforms. Of course, a voicemail system in accordance with an embodiment of the invention is not limited to these particular arrangements and numerous other arrangements and approaches are possible. As an example, the voicemail UI 140 is described herein as providing an interface to callers leaving voicemail messages and to recipients of those voicemail messages when retrieving messages. The voicemail UI 140 is further described to include message storage and user information. In an alternative embodiment, these features may be implemented in any number of platforms separate, and are shown and described in an integrated platform herein for the sake of simplicity.

Each of the platforms of the voicemail system shown in FIG. 1 (and the system of FIG. 2) will be described in detail below with reference to FIGS. 3, 4 and 5. Briefly, however, as may be seen in FIG. 1, the voicemail UI 140 is operatively coupled with the message store 155 and the message processor 160. Such a configuration provides for the ability to communicate voicemail messages received at the voicemail UI 140 in substantially simultaneous fashion to the message store 155 and the message processor 160. Such a configuration may allow for relatively faster processing of voicemail messages by the message processor 160 (as compared to the configuration shown in FIG. 2, which is discussed below) because the voicemail message is communicated to the message processor 160 at substantially the same time as the message store 155.

As may also be seen from FIG. 1, the message processor 160 is operatively coupled with the message store 155, which provides the message processor 160 with ability to communicate phone number information extracted from voicemail messages directly to the message store 155, rather than communicating that information via the voicemail UI 140.

The message processor 160 may take the form of a telecommunications platform with the ability to execute service logic included therein in the form of machine readable instructions. These machine readable instructions may be contained on a storage device such as a hard drive or a semiconductor memory device, for example. Alternatively, any appropriate storage device may be used. When executed, the service logic analyzes the spoken content of a voicemail message received at the voicemail UI 140 (and communicated to the message processor 160) for the presence of a spoken phone number, which may be accomplished by using speech recognition techniques. When a phone number, such as a seven digit, ten digit, eleven digit or international phone number is detected, the service logic then extracts that phone number from the voicemail message by, for example, converting the spoken phone number to text data (e.g. using a speech-to-text converter).

After the spoken phone number is extracted, the extracted number is communicated to the message store 155 where it is associated with the voicemail message in the message store, as is discussed in further detail below with reference to FIG. 3. In this context, communicating a voicemail message may include sending an analog audio stream, sending a series of data packets, streaming digital audio, or any other appropriate technique for communicating the voicemail message from one platform to another.

When the recipient of the voicemail message contacts the voicemail system (via voicemail UI 140) to retrieve the voicemail message, the voicemail UI 140, by executing service logic, communicates with the message store 155 to retrieve the voicemail message, the extracted phone number and any other phone numbers that may be associated with the voicemail message. The voicemail UI 140, by executing additional service logic, presents the recipient of the voicemail message with an option to dial the extracted number by, for example, depressing a specific key on his/her phone or speaking an appropriate response. Thus, the voicemail system shown in the communication network of FIG. 1 allows a voicemail recipient to return a call to a spoken number left in a voicemail message without having to write down and/or dial the spoken number.

Overview of an Alternative System for Returning Phone Calls

Figure 2:
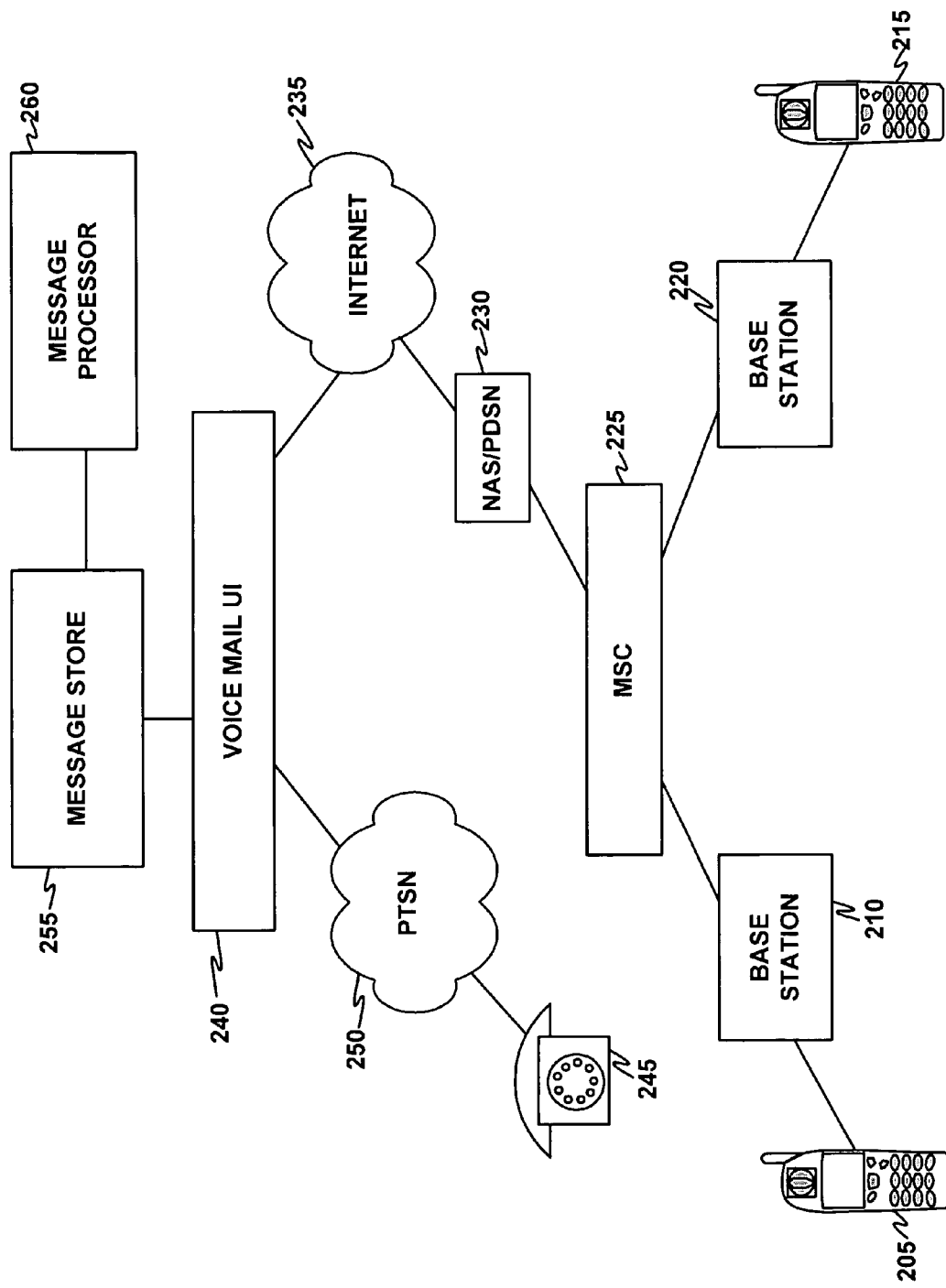
FIG. 2 is a network diagram illustrating a communications system that includes an alternative voicemail system in accordance with another embodiment of the invention.

Referring now to FIG. 2, an alternative communication network diagram is shown. The communication network illustrated in FIG. 2 is substantially similar to the network of FIG. 1. In FIG. 2, elements analogous with FIG. 1's elements are referenced with 200 series numbers that correspond with the 100 series numbers of FIG. 1. For the sake of brevity and clarity, the elements of FIG. 2 will only be discussed as they differ from the arrangement shown in FIG. 1.

For the communication network of FIG. 2, the voicemail message processor 260 is operationally coupled with the message store 255, but is not coupled with the voicemail UI 240. Therefore, for the configuration shown in FIG. 2, a voicemail message received at the voicemail UI 240 is first communicated to the message store 255 and then to the voicemail message processor 260. Depending on the load on the system (e.g., the number of callers and/or recipients connected with the voicemail system), the voicemail message may be communicated from the voicemail UI 240 to the message store 255 in its entirety and then, at a later time (such as when the recipient accesses the voicemail system) communicated to the voicemail message processor 260 to extract any spoken phone numbers in the message. Alternatively, the message store 255 may begin to communicate the voicemail message to the voicemail message processor 260 while the voicemail UI 240 is still communicating the voicemail message to it. Such an approach may be employed during times when there is little activity from callers and recipients on the voicemail and system bandwidth is readily available.

While the configuration of FIG. 2 (due to its serial arrangement) may result in additional time being employed to accomplish analysis of the voicemail message to extract any spoken phone numbers, such a configuration may reduce the communication bandwidth used by the voicemail UI 240 for communicating voicemail messages, which may be beneficial in certain situations.

For example, this configuration may be advantageous for voicemail systems that process a relatively large number of voicemail messages, such as a corporate voicemail system, for example. This configuration may be advantageous as it will allow for more efficient operation of the voicemail UI 240 in processing incoming voicemails and retrieved voicemails due to a reduction in the bandwidth used to communicate voicemail messages to the message processor 260, as compared to the configuration of FIG. 1. Of course, the particular configuration used for a specific voicemail system depends, at least in part, on the type of use that system will be put to (e.g., residential, commercial). The invention is, of course, not limited to the particular arrangements shown in FIGS. 1 and 2, or to any other particular arrangement.

Voicemail Message Store Database Record

Figure 3:
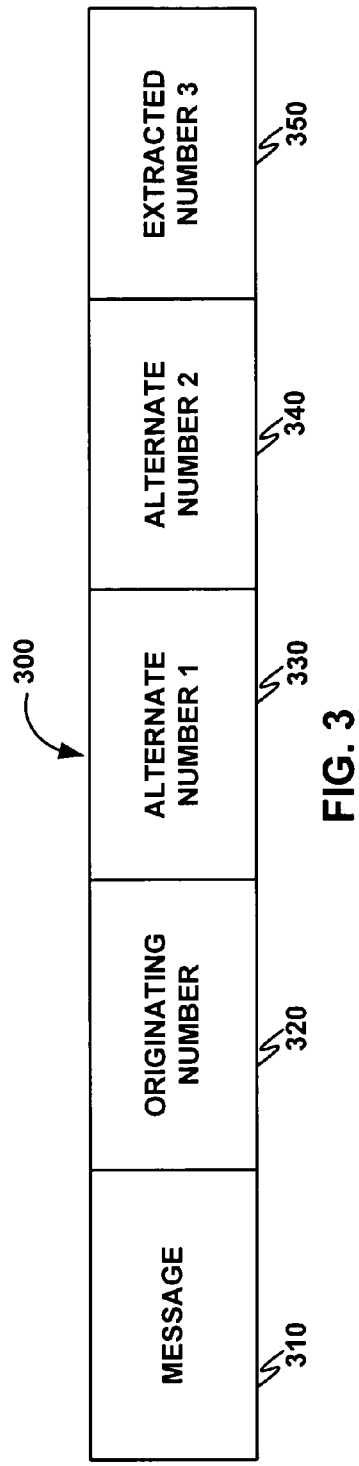
FIG. 3 is a table illustrating a voicemail message record in a voicemail message database in accordance with an embodiment of the invention.

Referring now to FIG. 3, a table is shown that illustrates a voicemail database record 300 for storing a voicemail message and phone numbers associated with a caller who left the particular voicemail message. Still also referring to FIG. 2, the database record 300 may be included in a voicemail message database contained on the message store 255. As shown in FIG. 3, the voicemail database record 300 includes a number of data fields for retaining various pieces of information associated with the voicemail message.

For example, a message data field 310 is used to store the spoken voicemail message. The message data field 310 may store the voicemail message as a digital audio file, such as a wave file, an MPEG-layer 3 file or a Windows® Media Audio file. Alternatively, the message store 255 may retain the spoken voicemail message as an analog audio stream, or in any other appropriate format, such as an encrypted and compressed data file, for example. An originating number data field 310 is used to store the number from which the caller who left the voicemail message called when the voicemail message was recorded. This information may be determined from caller-id information using the voicemail UI 240 of FIG. 2 and then be communicated to the message store 255 for inclusion in the voicemail database record 300 when the voicemail message is communicated from the voicemail UI 240.

Likewise, alternative number 1 and alternative number 2 data fields 330 and 340 are used to store alternative phone numbers known by the voicemail system that are associated with the caller who left the voicemail message contained in the message data field 310. The alternative phone numbers 1 and 2 may be determined by the voicemail UI 240 by comparing the originating number with contact information associated with the caller that was previously stored by the intended recipient of the voicemail message. For example, the originating number may be a home phone number of the caller and the alternative numbers may be an office number and mobile number. Once received from the voicemail UI 240, the message store 255 stores the office number and the mobile number in the alternative number data fields 330 and 340. Of course, additional data fields may be employed. These additional data fields may include additional alternative numbers, the caller's name, among any number of other types of information associated with the caller or the voicemail message left by the caller.

The voicemail database record 300 further includes an extracted number data field 350, which is used to store the spoken phone number that is extracted from the voicemail message. The extracted phone number is communicated to the message store 255 by the message processor 260 after the message processor 260 has applied service logic to analyze the voicemail message and extract the spoken number, as is discussed in further detail below with reference to FIG. 4. It will be appreciated that multiple spoken phone numbers may be included in the voicemail message and extracted by the message processor 260. In such a situation, additional extracted number fields would be included in the voicemail database record 300.

Upon retrieval of the voicemail message contained in the voicemail database record 300 by the recipient, the voicemail UI 240 communicates with the message store 255 to request the voicemail message and its related information. Responsive to this request, the message store 255 communicates the information contained in the various data fields of the voicemail database record 300 to the voicemail UI 240 for provision to the recipient. The voicemail UI 240's use of this information is discussed further below with reference to FIG. 5.

Voicemail Message Processor

Figure 4:
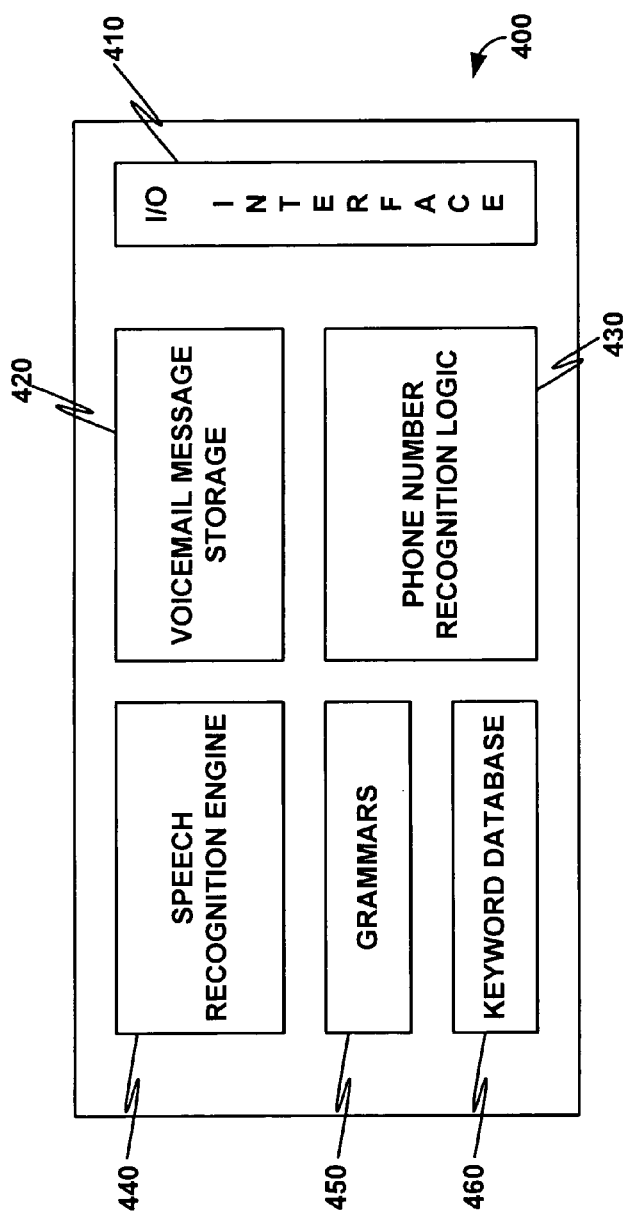
FIG. 4 is a block diagram of voicemail message processor in accordance with an embodiment of the invention.

Referring now to FIG. 4, a block diagram of a voicemail message processor 400 is shown. The message processor 400 may be implemented in the communication networks shown in FIGS. 1 and 2 as, respectively, the message processor 160 or 260. The message processor 400 will be described generally with additional reference to the communication network shown in FIG. 2 and with further reference to FIG. 1 where it differs from FIG. 2.

The message processor 400 includes an I/O interface 410, which is used to communicate with the Internet 235, the PSTN 250 and the message store 255 (as well as the message processor 160 for the communication network of FIG. 1). The message processor 400 further includes voicemail message storage 420, which is used for storing voicemail messages when communicated from the message store 255 for analysis (or from the voicemail UI 140 for FIG. 1). The voicemail message storage 420 may take the form of a volatile memory device, such a random access memory or a non-volatile memory device, such as a hard-disk drive.

The message processor 400 further includes phone number recognition logic 430, speech recognition logic 440 and grammars 450, which are used to analyze voicemail messages and extract spoken phone numbers from those messages. While the phone number recognition logic 430, the speech recognition logic 440 and the grammars 450 are shown as three separate entities in FIG. 4, it will be appreciated that these entities may be combined into a single entity, such as phone number extraction logic, for example. The phone number recognition logic 430, the speech recognition logic 440 and the grammars 450 are shown as three separate entities in FIG. 4 for purposes of discussion and illustration.

For the message processor 400, the phone number recognition logic 430 works in cooperation with the speech recognition logic 440 to analyze voicemail messages for the presence of, for example, seven digit, ten digit, eleven digit and international phone numbers. The speech recognition logic 440 analyzes the voicemail message by employing the grammars 450 to determine the presence of spoken numbers or digits. The phone number recognition logic 430 determines whether the spoken numbers identified by the speech recognition logic 440 are arranged in the form of phone numbers, as described above.

For the message processor 400, the speech recognition logic 440 and the grammars 450 implement a grammar based speech interpreter. In this context, a grammar based speech interpreter is a speech recognition engine (which may be implemented in hardware, software and/or firmware) that recognizes spoken numbers (and keywords as discussed further below) based on a defined set of grammars. A grammar defines a set of recognized responses, or the utterances ("phonemes") that correspond to numbers and keywords. For example, a grammar for the number sequence '5006' may include a set of phonemes corresponding with the spoken utterances of "five, zero, zero, six"; "five-thousand six"; and "fifty, zero, six", as some examples. Likewise, a grammar for the number sequence "800" may include a set of phonemes corresponding to the spoken utterances of "eight-hundred" and "eight, zero, zero." Further, the grammars 450 may, in the grammar for the numeral zero, include phonemes corresponding to the letter "O", as the letter "O" is often used to represent zeros in spoken phone numbers. Numerous other grammars are possible for identifying numerals of phone number sequences, and the invention is not limited to any particular set of grammars.

The phone number recognition logic 430 may further include instructions that provide for determining a statistical confidence level that a string of digits extracted from the voicemail message by the speech recognition engine 440 corresponds with a phone number (e.g., a seven, ten, eleven digit or international phone number). Such instructions may include instructions for performing a statistical analysis to establish a statistical confidence level that a spoken string of numerals is a phone number. These instructions of the phone number recognition 440 logic may further include a statistical limit that is applied to extracted numeral strings. For example, if a statistical limit of eighty-five percent is used, the phone recognition logic 430 would only associate (with the voicemail message) numeral strings that it determined to be phone numbers with an eighty-five percent or higher statistical confidence.

Voicemail User Interface

Figure 5:
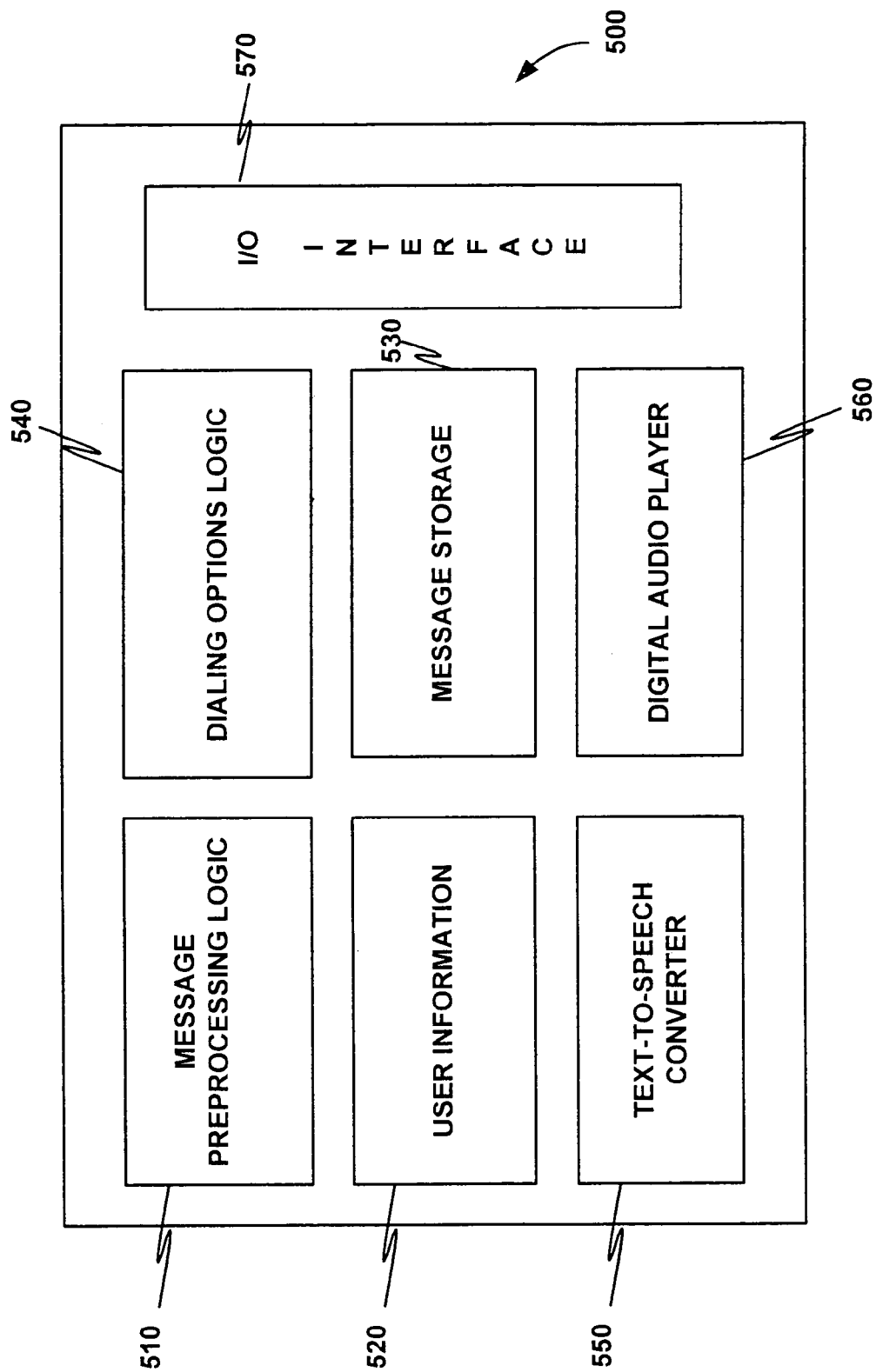
FIG. 5 is a block diagram of a voicemail user interface in accordance with an embodiment of the invention.

Referring now to FIG. 5, a block diagram of a voicemail UI 500 is shown. The voicemail UI 500 may be employed in the communication networks shown in FIGS. 1 and 2 as, respectively, the voicemail UI 140 and the voicemail UI 240. For purposes of this discussion, the voicemail UI 500 will be described generally with additional reference to the communication network shown in FIG. 2 and with further reference to FIG. 1 where it differs from FIG. 2.

The voicemail UI 500 is implemented as a telecommunications platform that includes message preprocessing logic 510 and user information 520, which may include contact information associated with the caller that was previously stored by the recipient, as was described above. The voicemail UI 500 further includes a message storage device 530, in similar fashion as the voicemail message storage device 420 of the message processor 400. For the voicemail UI 500, the message storage device 530 is employed to retain voicemail messages when they are being recorded by a caller, as well as when the messages are being communicated to/from the message store 255 (and to the message processor 160 of FIG. 1). This communication of messages to and from the voicemail UI 500 is accomplished via the I/O interface 570. The I/O interface 570 may include service logic in the form of machine executable instructions for facilitating this communication. Alternatively, these instructions may be contained elsewhere in the voicemail UI 500, such as in a general storage device (not shown), which may take the form of a hard-disk drive or the like.

For the voicemail UI 500, the message preprocessing logic 510 includes machine executable instructions that provide for playing a greeting to a caller, where the greeting prompts the caller to leave a voicemail message. The message preprocessing logic 510 may further include instructions for capturing and storing, at least temporarily, the voicemail message from the caller.

The message preprocessing logic 510 may also include instructions for modifying the content of the voicemail message once it is recorded. For example, such instructions may modify the voicemail message by removing periods of silence in the message, or may allow the caller to re-record a portion, or the entirety of a voicemail message as originally captured. These instructions may further include instructions to enhance the audio quality of the spoken voicemail message, such as by filtering noise, for example.

The message preprocessing logic 510 may still further include instructions for determining an originating phone number and one or more alternative phone numbers corresponding with a voicemail message and the caller who recorded the message. These instructions may determine the originating phone number based on caller-id information, as has been previously described. Further, these instructions may identify one or more alternative phone numbers associated with the caller by comparing the originating number associated with the voicemail message with contact information for the caller that has been stored in the user information 520 by the voicemail message recipient prior to the voicemail message being recorded. Alternatively, the user information 520 can be included in a separate address book database platform (not shown) that is operationally coupled with the voicemail UI 500 or the message processor 400.

For example, the originating number corresponding with the voicemail message may be a home number for the caller. By comparing the originating number (from caller-id information) with the recipient's previously stored contact information, the message preprocessing logic 510 may determine two alternative numbers (e.g., office and mobile) associated with the caller and the voicemail message and store these in the message storage 530. The alternative numbers are then communicated to the message store 255 and stored in the alternative number data fields 330 and 340 of the voicemail message database record 300 when the voicemail message is communicated from the voicemail UI 500.

As was previously discussed, when the recipient wishes to retrieve the voicemail message, the voicemail UI 500 will communicate with the message store 255 to retrieve the voicemail message information contained in the database record 300 of FIG. 3. The information from the database record 300 is then communicated to the voicemail UI 500 from the message store 255 and stored in the message storage 530.

After the information in the database record 300 is stored in the message store 530, dialing options logic 540, a text-to-speech converter 550 and a digital audio player 560 are employed to play the voicemail message back to the recipient and to provide dialing options based on the extracted phone number, the originating phone number and the alternative phone numbers 1 and 2.

Depending on how the extracted number, originating number and alternative numbers are stored, the voicemail UI 500 may use the text-to-speech converter 550 or the digital audio player 560 to provide the dialing options to the recipient. For example, if the numbers are stored as text data, the text-to-speech converter 550 would be used to provide the dialing options. Alternatively, if the numbers are stored as digital audio, the digital audio player 560 would be used. The phone numbers (or a descriptive label such as "home") may be included in digital audio files in the user information 520 for numbers known to the voicemail system. The extracted phone number may be in text data form if the message processor 260 uses speech-to-text conversion when extracting the spoken phone number. Alternatively, the extracted phone number may be a digital audio file corresponding with the portion of the voice mail in which the caller recites the spoken phone number.

Method for Returning Phone Calls

Figure 6:
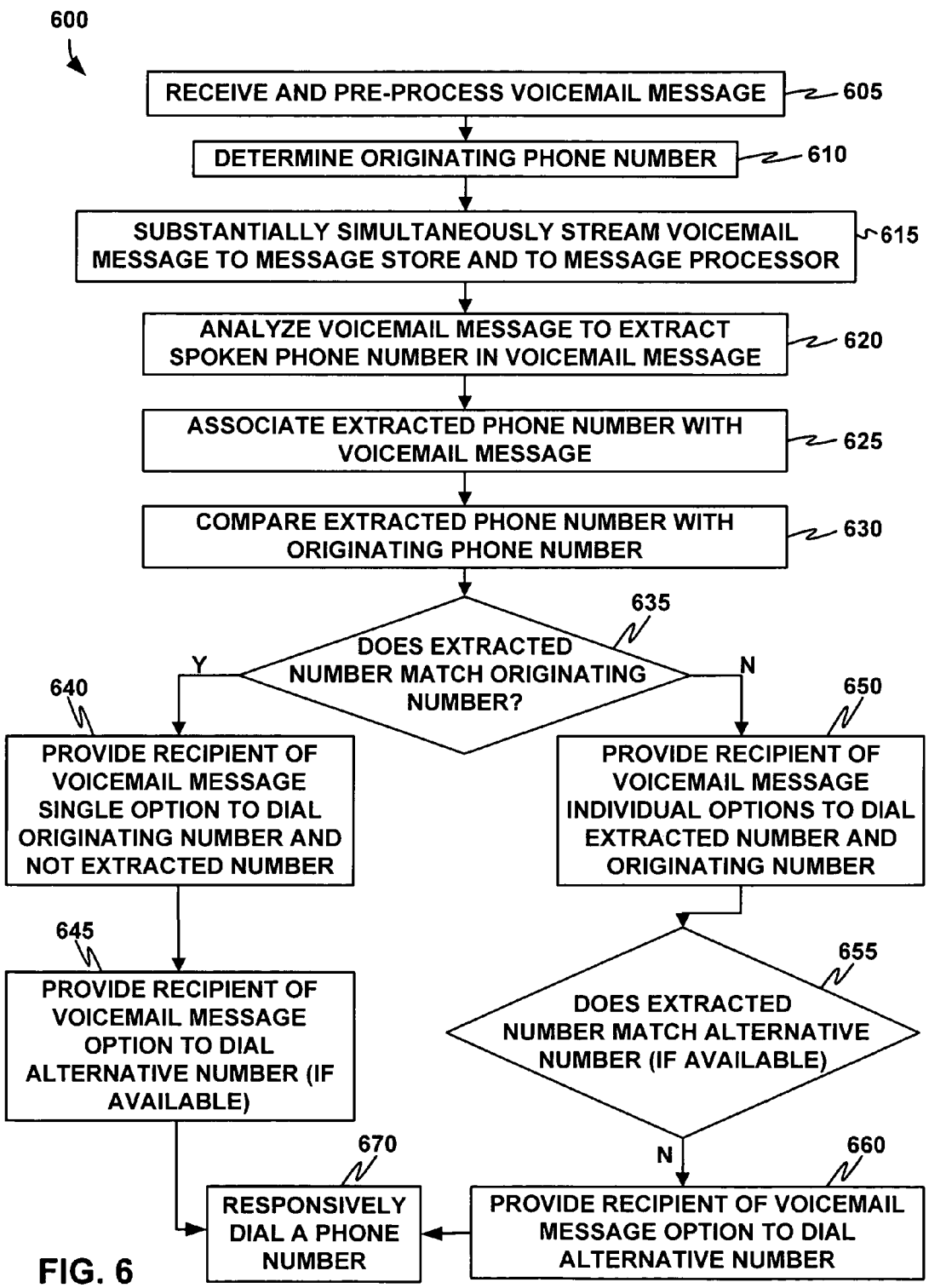
FIG. 6 is a flowchart illustrating a method of returning phone calls based on information in a voicemail message in accordance with an embodiment of the invention.

Referring now to FIG. 6, a flowchart illustrating a method 600 for returning phone calls based on information extracted from a voicemail message is shown. The method 600 may be implemented in the network shown in FIG. 1.

The method 600, at block 605 includes receiving and preprocessing a voicemail message, such as was described above with reference to FIG. 5. At block 605, the method includes determining the originating phone number, which may be done using caller-id information. Also, alternative numbers associated with a caller leaving the voicemail message may be determined at block 610, such as by comparing the originating number with contact information for the caller, as was described above with regard to FIG. 5. At block 615, the voicemail message is substantially simultaneously communicated from a voicemail UI to a message store and a message processor. At block 620, the voicemail message is analyzed (e.g. by a message processor) to extract a spoken phone number from the message. At block 625, the extracted phone number is associated with the voicemail message (e.g., in a voicemail message database record contained in a message store). At block 630, the extracted phone number is compared with the originating phone number determined at block 610 (e.g. in a voicemail UI).

At block 635, it is determined whether the extracted number matches the originating number. If the numbers match, the method proceeds to block 640. At block 640, a recipient of the voicemail message is provided with a single option to dial the originating number and not the extracted number (which are effectively interchangeable in this situation). At block 645, the recipient is further provided with an option to dial any alternative numbers that may be associated with the voicemail message. At block 670, the recipient selects one of the options (e.g., by depressing a specified key or speaking a specified response) and the selected number is responsively dialed. The selected number may be dialed using a speech recognition dialer, such as Sprint PCS Voice Command, available from Sprint PCS, 6450 Sprint Parkway, Overland Park, Kans. 66251. Any number of other approaches may also be employed for dialing the selected number.

If the originating number does not match the extracted number at block 635, the method proceeds to block 650. At block 650, the recipient is provided with individual options to dial the extracted number and the originating number. At block 655, it is determined whether the extracted number matches an alternative number associated with the voice mail. If the numbers match, no further action is taken. If they do not match, the recipient is provided with an option(s) to dial the alternative number(s). At block 670, the recipient selects one of the options (e.g., by depressing a specified key or speaking a specified response) and the selected number is responsively dialed.

Alternative Method for Returning Phone Calls

Figure 7:
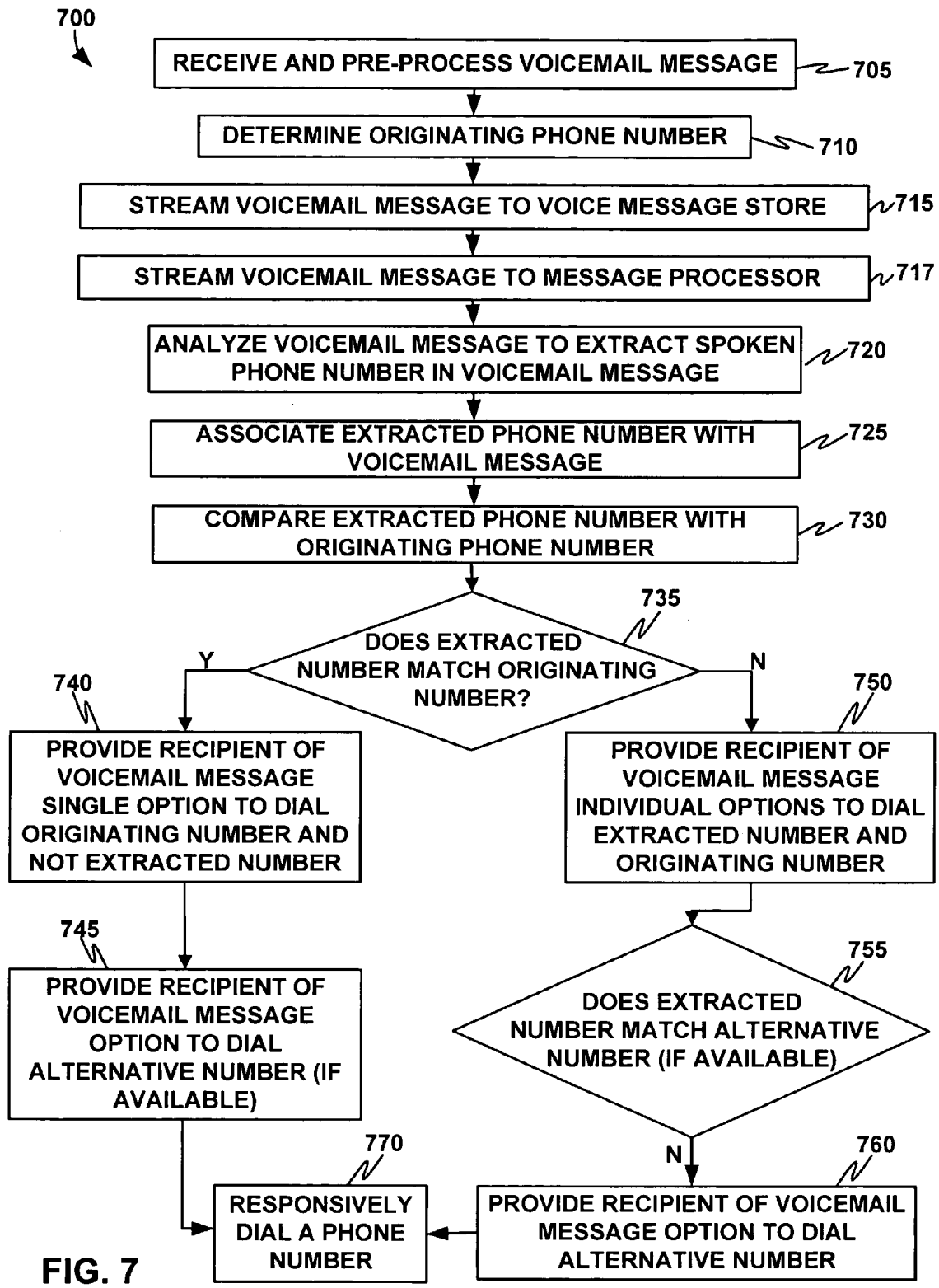
FIG. 7 is a flowchart illustrating an alternative method of returning phone calls based on information in a voicemail message in accordance with another embodiment of the invention.

Referring now to FIG. 7, a flowchart illustrating an alternative method 700 for returning phone calls based on information extracted from a voicemail message is shown. The method 700 may be implemented in the network shown in FIG. 2. The method 700 is substantially similar to the method 600 shown in FIG. 6. Analogous operations in the method 700 have 700 series reference numbers that correspond with the 600 series reference numbers of the method 600. In the interest of clarity and brevity, only the aspects of the method 700 that differ from the method 600 will be described.

As noted above, the method 700 corresponds with the network diagram of FIG. 2. Therefore, because the message store 255 and the message 260 are arranged serially for this communication system, the method 700 includes, at block 715 communicating a voicemail message to a message store and, subsequently, communicating the voicemail message to a message processor at block 717. Other than these two operations, the method 700 is substantially the same as the method 600.

CONCLUSION

Exemplary arrangements of the present invention have been described herein. It will be appreciated, however, that those skilled in the art will understand that changes and modifications may be made to these arrangements without departing from the true scope and spirit of the present invention, which is defined by the following claims.

What is claimed is:

1. A method for returning a phone call based on information in a voicemail message corresponding with the phone call, the method comprising:
   receiving the voicemail message;
   applying service logic to analyze the voicemail message to extract a spoken phone number included in the voicemail message;
   associating the extracted phone number with the voicemail message;
   in conjunction with retrieving the voicemail message, providing a recipient of the voicemail message with an option to dial the extracted phone number;
   determining an originating phone number associated with the phone call, wherein associating the extracted phone number with the voicemail message comprises comparing the extracted phone number with the originating number;
   in the event the extracted number matches the originating number, responsively determining nor to provide the recipient of the voicemail message with a duplicate option to dial the originating number;
   comparing the extracted phone number with an alternative number associated with the originating number; and
   in the event the extracted number marches the alternative number, responsively determining not to provide the recipient of the voicemail message with a duplicate option to dial the alternative number.

2. The method of claim 1, further comprising responsively dialing the extracted phone number as a result of the recipient selecting the option to dial the extracted phone number.

3. The method of claim 2, wherein dialing the extracted phone number comprises dialing the extracted phone number with a speech recognition dialer.

4. The method claim 2, wherein the recipient selects the option by one of depressing a specific key or speaking an appropriate response corresponding with the option.

5. The method of claim 1, further comprising:
   determining an originating phone number associated with the phone call; and
   providing the recipient of the voicemail message with an option to dial the originating phone number.

6. The method of claim 5, further comprising responsively dialing the originating phone number as a result of the recipient selecting the option to dial the originating phone number.

7. The method of claim 5, further comprising:
   providing the recipient of the voicemail message with an option to dial an alternative phone number associated with originating phone number.

8. The method of claim 7, further comprising responsively dialing the alternative phone number as a result of the recipient selecting the option to dial the alternative phone number.

9. The method of claim 1, wherein applying service logic to analyze the voicemail message comprises:
   analyzing the voicemail message using a set of machine executable instructions implementing a speech recognition engine, the speech recognition engine employing a set of grammars for extracting the spoken phone number from the voicemail message.

10. The method of claim 9, wherein analyzing the voicemail message comprises determining the presence of, and extracting at least one of: a seven digit phone number, a ten digit phone number, an eleven digit phone number and an international phone number.

11. The method of claim 9, wherein analyzing the voicemail message comprises employing the grammars to determine the presence of two, three and four digit numbers in the voicemail message.

12. The method of claim 9, wherein analyzing the voicemail message comprises employing the grammars to associate the numeral zero with an utterance corresponding with the letter "O" when extracting the spoken phone number.

* * * * *